US006380641B2

(12) United States Patent
Matsubara et al.

(10) Patent No.: US 6,380,641 B2
(45) Date of Patent: Apr. 30, 2002

(54) ENGINE STALL PREVENTION APPARATUS FOR A HYBRID VEHICLE PROVIDED WITH A MECHANISM THAT CHANGES THE ENGINE SPEED DEPENDING ON CLUTCH STATE DETECTION (75) Inventors: Atsushi Matsubara; Kazutomo Sawamura; Shinichi Kitajima; Atsushi Izumiura; Teruo Wakashiro, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/736,319

(22) Filed: Dec. 15, 2000

(30) Foreign Application Priority Data

Dec. 20, 1999 (JP) .............................. 11-361919

(51) Int. Cl.[7] ........................... F02N 11/00; F02N 11/06; H02P 9/04; B60K 6/02; B60K 6/06; B60K 1/00
(52) U.S. Cl. .................... 290/40 C; 180/65.2
(58) Field of Search ...................... 290/40 C; 180/65.2; 60/276; 318/139; 477/5

(56) References Cited

U.S. PATENT DOCUMENTS

| 4,930,607 | A | * | 6/1990 | Shimamura et al. | ........ 192/1.33 |
| 5,086,894 | A | * | 2/1992 | Iizuka et al. | ............... 192/3.29 |
| 5,614,666 | A | * | 3/1997 | Hara et al. | .................. 73/118.1 |
| 6,048,289 | A | * | 4/2000 | Hattori et al. | ................. 477/15 |
| 6,083,138 | A | * | 7/2000 | Aoyama et al. | ................ 477/5 |
| 6,183,389 | B1 | * | 2/2001 | Tabata | ............................ 477/5 |
| 6,262,491 | B1 | * | 7/2001 | Kitajima et al. | .......... 290/40 C |

FOREIGN PATENT DOCUMENTS

| JP | 7-123509 | | 5/1995 |
| JP | 2000145946 | A * | 5/2000 |

* cited by examiner

Primary Examiner—Nestor Ramirez
Assistant Examiner—Julio C. Gonzalez
(74) Attorney, Agent, or Firm—Armstrong, Westerman & Hattori, LLP (57) ABSTRACT This invention relates to an engine stall prevention apparatus for a hybrid vehicle. This engine stall prevention apparatus comprises a clutch operation detection device which detects an operation of a clutch; a clutch state determination device which determines the state of the clutch based on the relationship between the vehicle speed and the engine speed; a throttle opening degree determination device which determines the degree of throttle opening of the engine; a first engine speed modification device (S010) which modifies a charging/regeneration allowing lower limit engine speed value above which deceleration regeneration by the electric motor is allowed; and a half-engaged clutch determination maintaining device (S008) which outputs a determination signal indicating that the clutch is half-engaged for a predetermined period of time when the throttle is completely closed and the clutch is determined to be half-engaged. When a half-engaged clutch determination is maintained, the first engine speed modification device elevates the charging/regeneration allowing lower limit engine speed value.

4 Claims, 10 Drawing Sheets

ENGINE STALL PREVENTION APPARATUS FOR A HYBRID VEHICLE PROVIDED WITH A MECHANISM THAT CHANGES THE ENGINE SPEED DEPENDING ON CLUTCH STATE DETECTION

BACKGROUND OF THE INVENTION

1. Field of the Invention

The present invention relates to an engine stall prevention apparatus for a hybrid vehicle. In particular, the present invention relates to a technique which can prevent an engine stall when the clutch is half-engaged.

2. Description of Related Art

Parallel hybrid vehicles are a type of hybrid vehicles in which electric motors are used for assisting the output of engines. In these parallel hybrid vehicles, various controls are performed, for example, as shown in Japanese Unexamined Patent Application, First Publication No. Hei 7-123509, when the vehicle accelerates, the motor assists the output of the engine, and when the vehicle decelerates, the motor generates electric power by deceleration regeneration to charge the battery. Therefore, it is possible to constantly maintain electrical energy (the remaining battery charge) in the battery and to respond to demands by the driver of the vehicle.

As described above, in a parallel hybrid vehicle, when deceleration regeneration is performed, the electric motor is driven by the rotational force of the driving wheels to function as a power generator.

However, in a parallel hybrid vehicle having a manual transmission, because the output shaft of an engine is directly connected to the output shaft of the motor, if the clutch is disengaged to disengage the driving wheels and the output shaft of the engine when the motor is performing deceleration regeneration, the torque of the driving wheels is not transmitted to the motor, and all of the torque generated by the regeneration in the motor is applied to the engine as a large load. In general, when a vehicle decelerates, since the degree of throttle opening is small and the output of the engine is limited to a small value, if deceleration regeneration is performed in such a state, there will be a problem that the engine speed may suddenly drop causing the engine to stall and the engine may be overloaded.

SUMMARY OF THE INVENTION

An object of the present invention is to provide an engine stall prevention apparatus for a hybrid vehicle, which can detect the half-engaged state of a clutch and can reliably prevent an engine stall without overloading the engine.

The first aspect of the present invention provides an engine stall prevention apparatus for a hybrid vehicle which comprises an engine (for example, engine E in the embodiment) which outputs a driving force to drive a vehicle; an electric motor (for example, motor M in the embodiment) which assists the driving force of the engine; and a power storage unit (for example, battery 3 in the embodiment) which stores electric power generated by the electric motor when the electric motor is functioning as power generator and/or stores regeneration energy when deceleration regeneration is performed by the electric motor; the engine stall prevention apparatus comprising: a clutch operation detection device (for example, steps S053 and S060A in the embodiment) which detects the operation of the clutch by a driver; a clutch state determination device (for example, steps S057, S058, S059, S060, and S061 in the embodiment) which determines the state of the clutch based on the relationship between vehicle speed and engine speed; a throttle opening degree determination device (for example, step S022 in the embodiment) which determines the degree of throttle opening of the engine; a first engine speed modification device (for example, step S010 in the embodiment) which modifies a charging/regeneration allowing lower limit engine speed value (for example, the fully closed state corresponding to the opening at the idle state in the embodiment) above which deceleration regeneration by the electric motor is allowed; and a half-engaged clutch determination maintaining device (for example, steps S008, S073, S082, and S111) which maintains a determination signal indicating that the clutch is half-engaged for a predetermined period of time, when the clutch operation detection device detects that the clutch is not disengaged, and the throttle opening degree determination device determines that the degree of throttle opening of the engine is no more than a predetermined degree, and the clutch state determination device determines that the clutch is half-engaged; wherein the first engine speed modification device elevates the charging/regeneration allowing lower limit engine speed value while the half-engaged clutch determination maintaining device maintains the determination that the clutch is half-engaged.

By constructing the apparatus as above, the engine stall prevention apparatus of the present invention increases, when a half-engaged clutch determination is maintained, the charging/regeneration allowing lower limit engine speed value, below which the charging and regeneration is not permitted. Therefore, the load applied to the engine can be reduced by stopping charging/regeneration earlier than usual, and engine stalls due to the regeneration operation in a half-engaged clutch state can be effectively prevented.

According to the second aspect of the present invention, the engine stall prevention apparatus of the present invention may further comprise a second engine speed modification device (for example, steps S077 and S078) which modifies a fuel cut lower limit engine speed value above which a fuel amount to be supplied to the engine is cut during deceleration regeneration, and the second engine speed modification device elevates the fuel cut lower limit engine speed value while the half-engaged clutch determination maintaining device outputs a determination signal indicating that the clutch is half-engaged.

By constructing the apparatus as above, when a half-engaged clutch determination is maintained, the second engine speed modification device increases the fuel cut lower limit engine speed value, and the engine speed value at which fuel supply to the engine is resumed is increased. Therefore, the load applied to the engine can be reduced by resuming the fuel supply to the engine earlier than usual, and engine stalls due to the load increase in the half-engaged clutch state can be more effectively prevented.

According to the third aspect of the present invention, the engine stall prevention apparatus may further comprise an engine start allowing device (for example, step S113 in the embodiment) which allows the electric motor to start the engine or to assist the output of the engine. The engine start allowing device drives the electric motor to start the engine or to assist the output of the engine, while the half-engaged clutch determination maintaining device outputs a determination signal indicating that the clutch is half-engaged, and the engine speed becomes lower than a predetermined engine speed value.

By constructing the apparatus as above, when the present engine speed becomes lower than the forced motor start engine speed value, the engine start allowing device drives the electric motor to start the engine. Therefore, it is possible to forcibly drive the engine when the engine is likely to stall, and engine stall can be more effectively prevented.

DETAILED DESCRIPTION OF THE INVENTION

Hereinafter, a preferred embodiment of an engine stall prevention apparatus for a hybrid vehicle according to the present invention will be explained referring to the figures.

Figure 1:
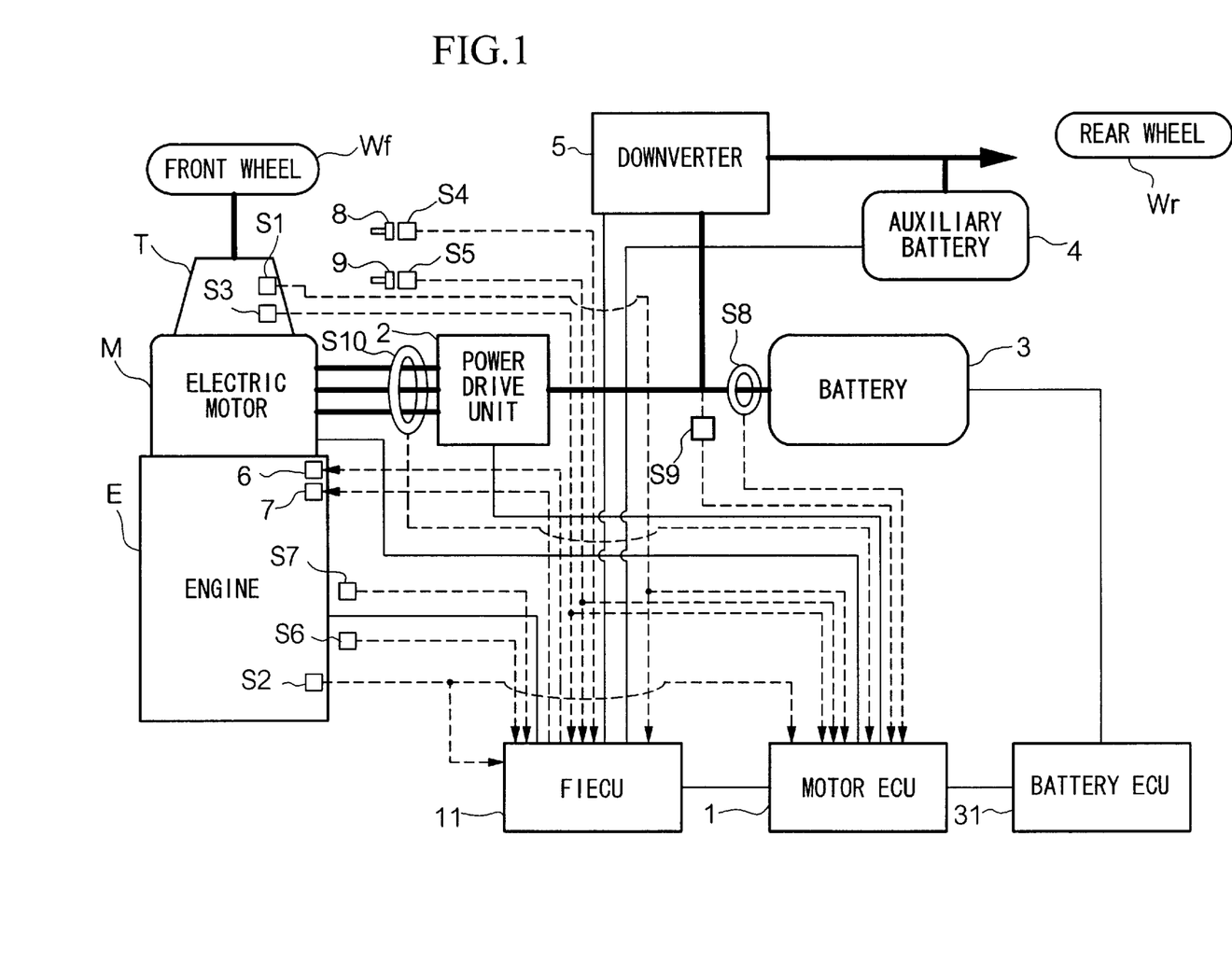
FIG. 1 is a block diagram of a hybrid vehicle according to a first embodiment of the present invention.

FIG. 1 is a block diagram illustrating a parallel hybrid vehicle in which an embodiment of the present invention is applied. The vehicle comprises an engine E which is activated by the combustion energy of a fuel, and an electric motor M which is activated by electric power and assists the engine E. The driving force generated by both the engine E and the electric motor M is transmitted via a transmission T consisting of a manual transmission to a pair of driving wheels (in this embodiment, the front wheels) Wf. At the time of the deceleration of the hybrid vehicle, the driving force is transmitted from the driving wheels Wf to the electric motor M, and the electric motor M functions as a generator. That is, the electric motor M recovers the kinetic energy of the vehicle body as electric energy, and the recovered electric energy is used for charging a battery 3 which will be explained later. The vehicle has also a pair of rear wheels Wr.

The driving of the motor M and the regenerating operation of the motor M are controlled by a power drive unit 2 according to control commands transmitted from a motor ECU 1. A high voltage battery 3 for sending and receiving electric energy to and from the motor M is connected to the power drive unit 2. The battery 3 includes a plurality of modules connected in series, and in each module, a plurality of cells are connected in series. The hybrid vehicle includes a 12-V auxiliary battery 4 for driving various accessories. The auxiliary battery 4 is connected to the battery 3 via a downverter 5. The downverter 5 is controlled by an fuel injection electronic control unit (FIECU) 11, and reduces the voltage from the battery 3 so as to charge the auxiliary battery 4.

The motor ECU 1 controls the electric motor M under the control of the FIECU 11. An electric current sensor S8 and a voltage sensor S9 are provided for measuring the electric current and voltage supplied from the battery 3, an electric current sensor S10 is provided for measuring the three phase electric current supplied to the electric motor M from the power drive unit 2, and the outputs of these sensors S8, S9, and S10 are input to the motor ECU 1. The motor ECU 1 controls the power drive unit 2 in accordance with the signals from these sensors S8, S9, and S10.

The FIECU 11 controls, in addition to the motor ECU 1 and the downverter 5, a fuel supply amount controller 6 for controlling the amount of fuel supplied to the engine E, a starter motor 7, the ignition timing, etc. Therefore, the FIECU 11 receives (i) a signal from a speed sensor S1 for detecting the vehicle speed based on the rotation of the drive shaft of transmission T, (ii) a signal from an engine (rotational) speed sensor S2 for detecting the engine (rotational) speed, (iii) a signal from a neutral position switch S3 for detecting the neutral position of the transmission T, (iv) a signal from a brake switch S4 for detecting operation of a brake pedal 8, (v) a signal from a clutch switch S5 for detecting the operation of a clutch pedal 9, (vi) a signal from a throttle opening-degree sensor S6 for detecting the degree of opening TH of the throttle (valve), and (vii) a signal from an air-intake passage pressure sensor S7 for detecting the air-intake passage (negative) pressure PB. As shown in FIG. 1, a battery ECU 31 is provided for protecting the battery 3, and the battery ECU 31 calculates the remaining capacity SOC of the battery 3.

This hybrid vehicle can enter various control modes, such as an "idle stop mode", "idle mode", a "deceleration mode", an "acceleration mode", and a "cruise mode". Referring to the flowchart shown in FIG. 2, the process for determining the above four motor control modes will be explained.

Figure 2:
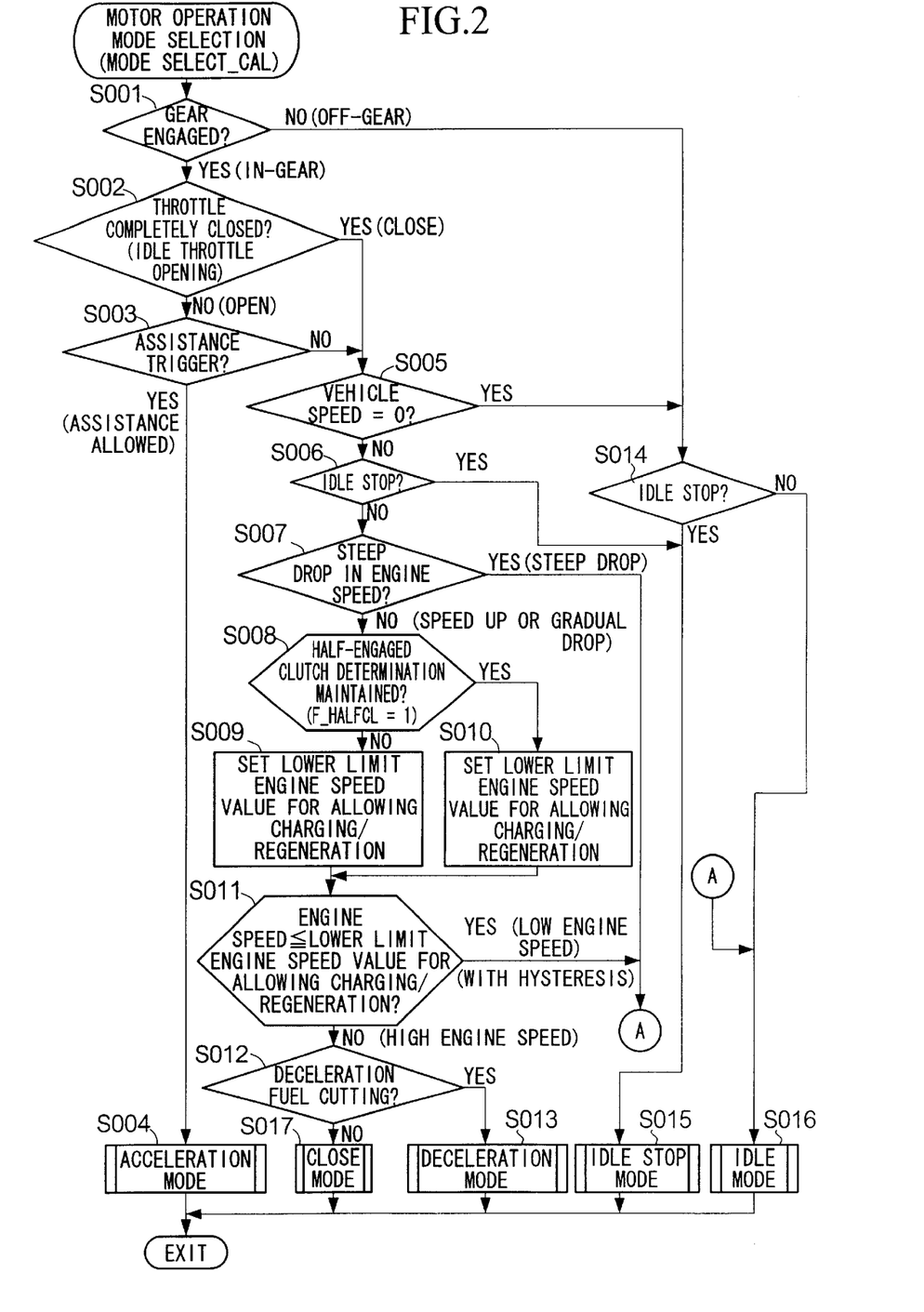
FIG. 2 is a flowchart showing a process for determining the motor operation mode according to the first embodiment.
Figure 4:
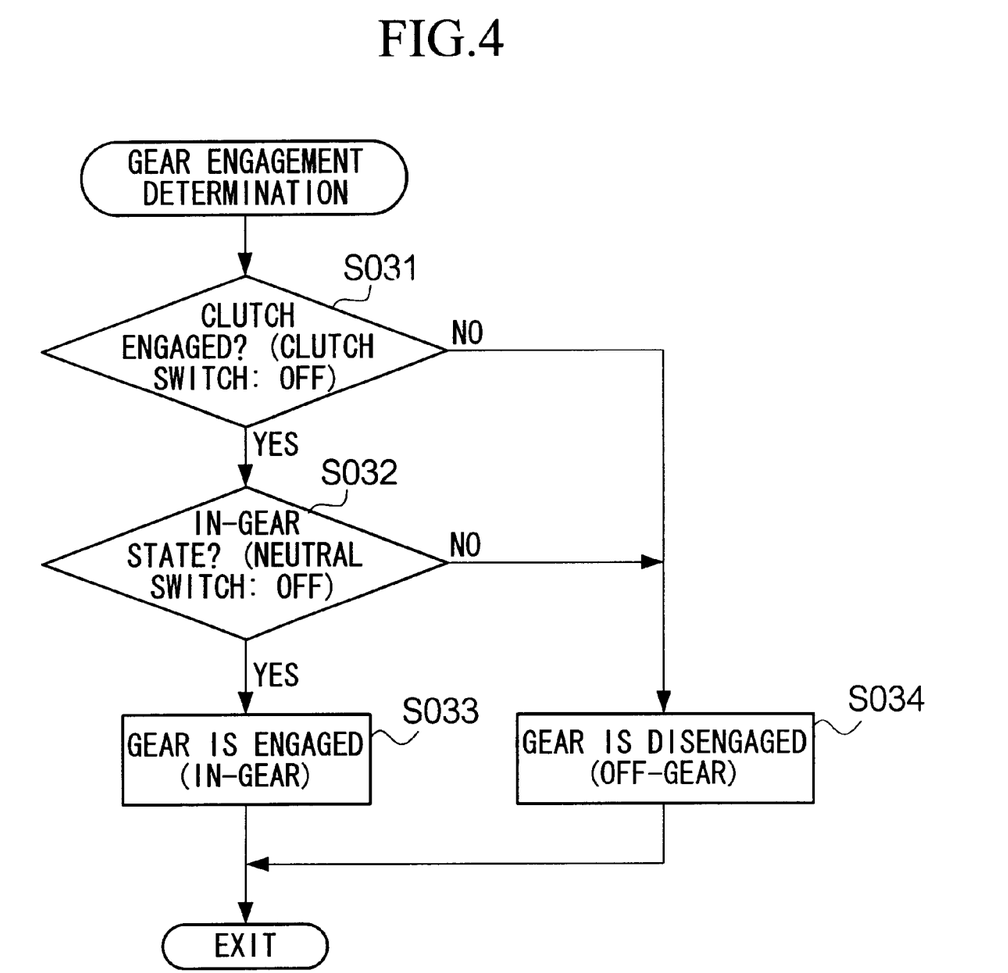
FIG. 4 is a flowchart showing a process for determining the gear engagement state according to the first embodiment.

First, in step S001, it is determined whether the present state is an in-gear state in accordance with the flow shown in FIG. 4. This flow will be explained later in detail. When the present state is determined to be an off-gear state in step S001, the flow proceeds to step S014, and it is determined whether an idle stop is being performed. If an idle stop is being performed, the flow proceeds to step S015, and the driving mode of the vehicle is set to an idle stop mode. In this idle stop mode, for example, when the vehicle is stopped, the engine E will be stopped upon predetermined conditions. In contrast, if it is determined in step S014 that an idle stop is not performed, the flow proceeds to step S016, and the driving mode of the vehicle is set to the idle mode. In the idle mode, fuel is continuously supplied to the engine E so as to maintain the engine in an idling state.

In step S001, if it is determined that the gears are engaged (that is, an in-gear state), the flow proceeds to step S002, and it is determined whether the throttle is completely closed. If the throttle is not completely closed, the flow proceeds to step S003 in order to determine whether an assistance trigger is being output. If an assistance trigger is being output, the flow proceeds to step S004, the driving mode of the vehicle is set to the acceleration mode, and then, the flow ends. In this acceleration mode, the electric motor M assists the output of the engine E.

When it is determined in step S002 that the throttle is completely closed, or when it is determined in step S003 that an assistance trigger is not output, the flow proceeds to step S005.

In step S005, it is determined whether the vehicle speed is zero. If the vehicle speed is zero, the flow proceeds to step S014. If the vehicle speed is not zero, the flow proceeds to step S006, and it is determined whether an idle stop is being performed. If it is determined in step S006 that an idle stop is being performed, the flow proceeds to step S015. If an idle stop is not performed in step S006, the flow proceeds to step S007, and it is determined whether a steep drop in engine speed has occurred. If it is determined in step S007 that a steep drop in engine speed has occurred, the flow proceeds to step S016, and the driving mode is set to the idle mode. By changing to the idle mode, for example, in the case where the deceleration regeneration is being performed, the deceleration regeneration is stopped so as to reduce the load of the engine E, and engine stalls can be prevented. If it is determined in step S007 that there is not a steep drop in engine speed, the flow proceeds to step S008. The threshold of engine speed change for determining whether there is a steep drop in engine speed is, for example, 300 rpm/100 msec.

In step S008, if it is determined whether the half-engaged clutch determination described later is maintained, by means of determining whether a half-engaged clutch determination maintaining flag F_HALFCL is "1". The flow for setting this half-engaged clutch determination maintaining flag F_HALFCL will be explained later. If it is determined in step S008 that a half-engaged clutch determination is not maintained, the flow proceeds to step S009. In step S009, an engine speed value corresponding to the present gear position is retrieved in a predetermined table, the retrieved engine speed value is set as a charging/regeneration allowing lower limit engine speed value above which the charging of the battery 3 and regeneration by the electric motor M are allowed, and the flow proceeds to step S011.

If it is determined in step S008 that a half-engaged clutch determination is maintained, the flow proceeds to step S010. In step S010, an engine speed value corresponding to the present gear position is retrieved in the predetermined table, and a predetermined value α is added to the retrieved engine speed value. The obtained value is set as a charging/regeneration allowing lower limit engine speed value above which the charging of the battery 3 and regeneration by the electric motor M are allowed, and the flow proceeds to step S011. For example, the predetermined value α is 1000 rpm, and in this case, the charging/regeneration allowing lower limit engine speed value is 1500 rpm.

In this way, when a half-engaged clutch determination is maintained, because the charging/regeneration allowing lower limit engine speed value is increased by adding the predetermined compensating value α, the upper limit value, below which the charging of the battery 3 and regeneration by the electric motor M are not performed, is raised, and the load of the engine E can be reduced. Therefore, engine stalls can be prevented.

In step S011, the present engine speed is compared with the charging/regeneration allowing lower limit engine speed value. Here, the charging/regeneration allowing lower limit engine speed value used in step S011 is a value having hysteresis as is explained later.

If it is determined in step S011 that the present engine speed is equal to or below the charging/regeneration allowing lower limit engine speed value, the flow proceeds to step S016, and the driving mode is set to the idle mode.

If it is determined in step S011 that the present engine speed is higher than the charging/regeneration allowing lower limit engine speed value, the flow proceeds to step S012, and it is determined whether deceleration fuel cut is being performed. If it is determined in step S012 that the deceleration fuel cut is being performed, the flow proceeds to step S013, and the driving mode is set to the deceleration mode. In this deceleration mode, regeneration braking is performed by the electric motor M.

In contrast, If it is determined in step S012 that the deceleration fuel cut is not being performed, the flow proceeds to step S017, and the driving mode is set to the cruising mode. In this cruising mode, the electric motor M is not activated, and only the engine E drives the vehicle.

Next, referring to FIG. 3, the flow for determining whether a half-engaged clutch determination is maintained will be explained.

In step S021, it is determined whether the gears are engaged in accordance with a process which will be explained later. If it is determined in step S021 that the gears are engaged, the flow proceeds to step S022, and it is determined whether the throttle is completely closed. If it is determined in step S022 that the throttle is not completely closed, the flow proceeds to step S023, and the half-engaged clutch determination maintaining flag F_HALFCL is set to "0" so that the half-engaged clutch determination is halted. If it is determined in step S021 that the gears are not engaged, the flow ends. According to this flow, when the driver of the vehicle depresses an acceleration pedal, the half-engaged clutch determination is halted. Therefore, it is possible to rapidly halt the half-engaged clutch determination according to an action by the driver.

In step S022, if it is determined that the throttle is completely closed, the flow proceeds to step S024, and it is determined whether a half-engaged clutch determination allowance timer value is "0". If the half-engaged clutch determination allowance timer value is "0", the flow proceeds to step S025. If the half-engaged clutch determination allowance timer value is not "0", the flow ends. This half-engaged clutch determination allowance timer value will be set in step S055 shown in FIG. 5 which will be explained later.

In step S025, it is determined whether the gear position is shifted to the higher ratio position. If it determined in step S025 that the gear position is not shifted to the higher ratio position, the flow proceeds to step S026, and it is further determined whether the engine speed has steeply dropped. If it is determined in step S026 that the engine speed has steeply dropped, the flow proceeds to step S027, and the half-engaged clutch determination maintaining flag F_HALFCL is set to "1" so that the half-engaged clutch determination is maintained. Thus, the flow ends. In contrast, if it is determined in step S026 that the engine speed has not steeply dropped, the flow ends.

Next, with regard to step S001 shown in FIG. 2 and step S021 shown in FIG. 3, the flow for determining whether the gears are engaged will be explained referring to FIG. 4. In step S031, it is determined whether the clutch switch S5 is in the OFF state, in order to determine whether the clutch is engaged. If it is determined in step S031 that the clutch switch S5 is in the ON state, the flow proceeds to step S034, and the present state is determined to be an off-gear state. Then, the flow ends. If it is determined in step S031 that the clutch switch S5 is in the OFF state, the flow proceeds to step S032, and it is determined whether the neutral switch S3 is in the OFF state in order to determine whether the gears are engaged.

If it is determined in step S032 that the neutral switch S3 is in the OFF state, the flow proceeds to step S033, and it is determined that the gears are engaged (that is, in an in-gear state). Then, the flow ends. If it is determined in step S032 that the present state is not an in-gear state, the flow proceeds to step S034, and it is determined that the gears have been disengaged.

Figure 5:
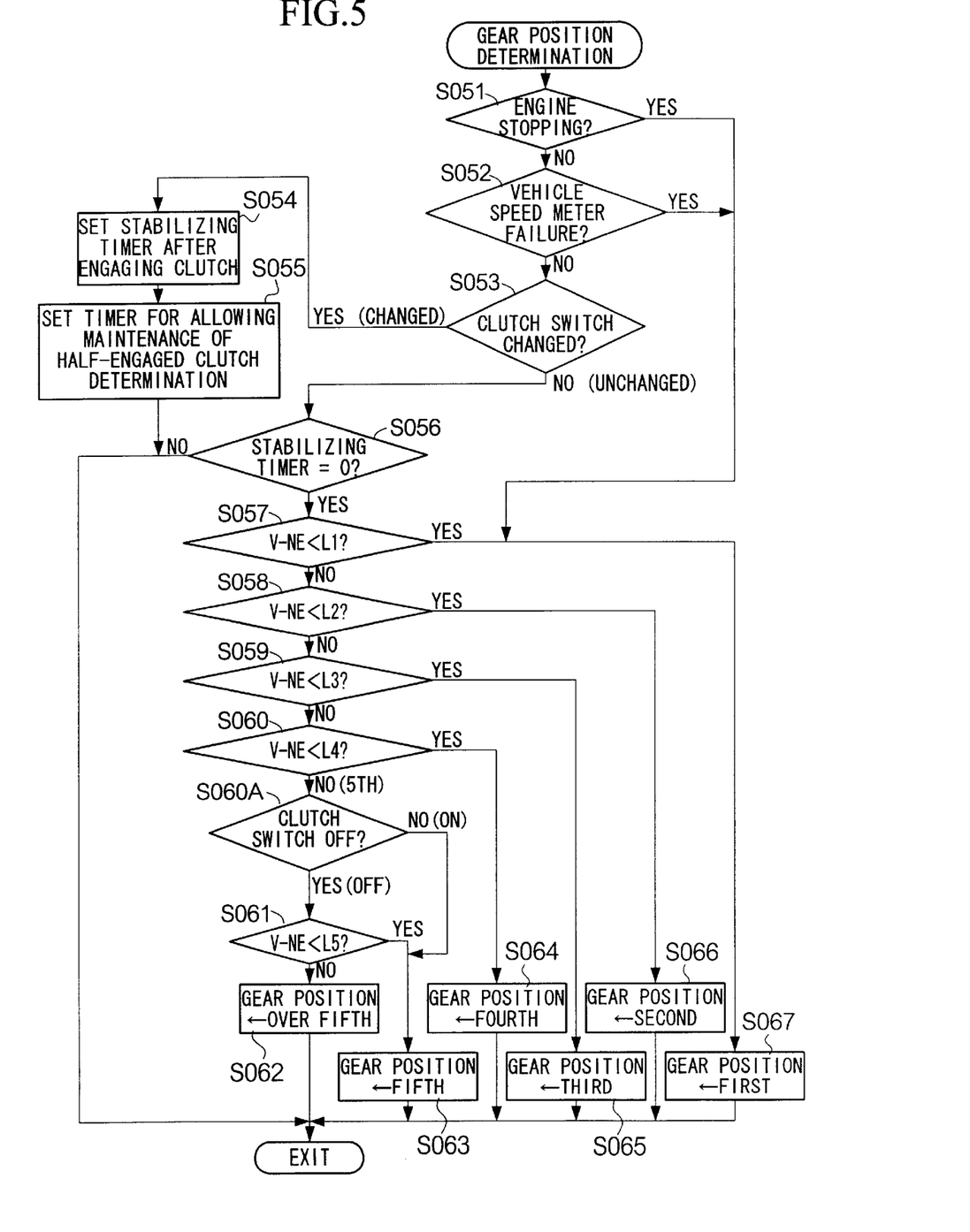
FIG. 5 is a flowchart showing a process for determining the gear position according to the first embodiment.

Next, FIG. 5 illustrates a flowchart for determining gear position, and this flow will be explained referring to the graph shown in FIG. 9.

First, the reason why the gear position can be determined based on the engine speed NE and the vehicle speed V will be explained. In a manual transmission vehicle, when the gears are engaged (that is, the gear position is other than the neutral position), and further when the clutch is engaged, the output shaft of the engine E and the driving wheels Wf are directly connected. At this time, as shown in FIG. 9, the relationship between the vehicle speed V and the engine speed NE is a proportional relationship at each gear ratio determined by the gear position, and the gradient of each graph corresponds to the gear ratio.

Figure 9:
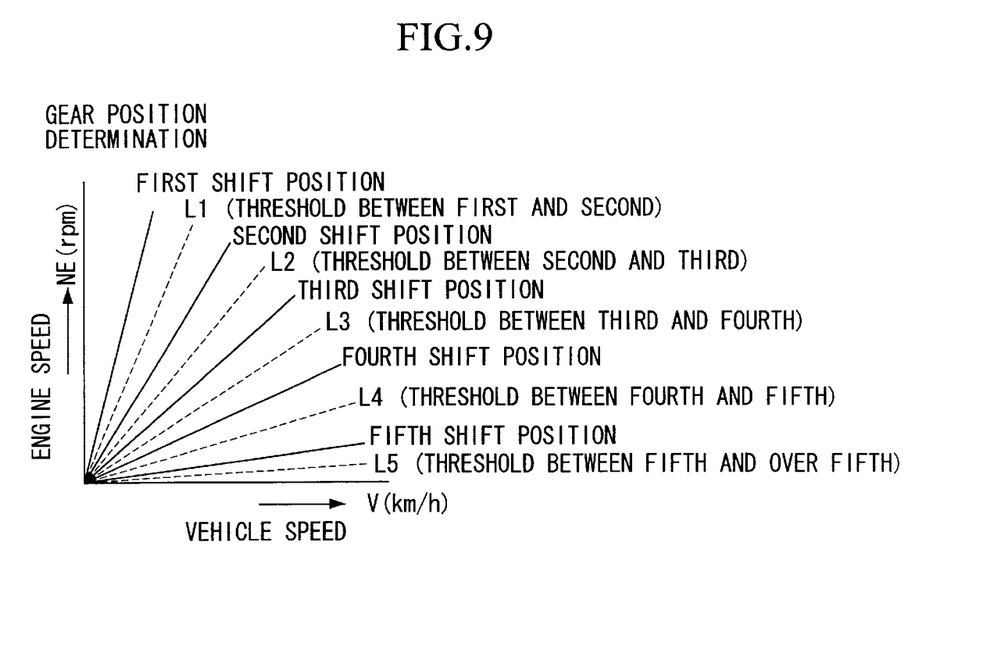
FIG. 9 is a graph explaining the process for determining the gear position shown in FIG. 5.

Therefore, when the output shaft of the engine E and the driving wheels Wf are connected, a coordinate expressed by an engine speed NE and a vehicle speed V which are respectively measured can be positioned on one of the graphs shown in FIG. 9. Therefore, by determining which graph includes the measured coordinate, the present gear position can be estimated.

In this embodiment, as shown in FIG. 9, a first boundary line L1 is provided between the linear graphs corresponding respectively to the first and second shift positions. As well, second to fourth boundary lines L2 to L4 are respectively provided between the neighboring linear graphs corresponding to the second to fifth shift positions. Furthermore, in order to detect a change from the fifth shift position, a fifth boundary line L5 is provided between the linear graph corresponding to the fifth shift position and an imaginary linear graph corresponding to an imaginary sixth shift position which does not actually exist. Therefore, the engine speed NE vs. vehicle speed V plane is divided into six areas by the first to fifth boundary lines L1 to L5, and by determining the area to which the measured coordinate belongs, it is possible to determine the present gear position.

The actual gear position determination is performed as follows. In step S051, it is determined whether the engine E is stalling. If it is determined that the engine E is stalling, the flow proceeds to step S067, and it is determined that the present gear position is the first shift position. If it is determined in step S051 that the engine E is not stalling, the flow proceeds to step S052, and it is determined whether the vehicle speed sensor S1 has failed. If the vehicle speed sensor S1 has failed, the flow proceeds to step S067. If the vehicle speed sensor S1 has not failed, the flow proceeds to step S053, and it is further determined whether the state of the clutch switch S5 has changed.

If a change is detected in the state of the clutch switch S5, the flow proceeds to step S054, and a stabilizing timer is set for waiting for stabilization after engaging the clutch. Then, the flow proceeds to step S055, and a half-engaged clutch determination maintenance allowing timer is set for allowing maintenance of the half-engaged clutch determination.

If a change is not detected in the state of the clutch switch S5 in step S053, the flow proceeds to step S056, and it is determined whether the value of the stabilizing timer is "0". If the value of the stabilizing timer is not "0", the flow ends. In contrast, if the value of the stabilizing timer is "0" in step S056, the flow proceeds to step S057, and it is determined whether the coordinate corresponding to the present engine speed NE and the present vehicle speed V is positioned at the left side of first boundary line L1 in FIG. 9 (that is, whether the ratio V/NE of the coordinate is smaller than the ratio V/NE of the boundary line L1).

If it is determined in step S057 that the ratio V/NE of the coordinate is smaller than the ratio V/NE of the boundary line L1, the flow proceeds to step S067, and it is determined that the present gear position is the first shift position. Then, the flow ends.

If it is determined in step S057 that the ratio V/NE of the coordinate is equal to or greater than the ratio V/NE of the boundary line L1, the flow proceeds to step S058, and it is further determined whether the ratio V/NE of the coordinate is smaller than the ratio V/NE of the boundary line L2. If it is determined in step S058 that the ratio V/NE of the coordinate is smaller than the ratio V/NE of the boundary line L2, the flow proceeds to step S066, and it is determined that the present gear position is the second shift position. Then, the flow ends.

If it is determined in step S058 that the ratio V/NE of the coordinate is equal to or greater than the ratio V/NE of the boundary line L2, the flow proceeds to step S059, and it is further determined whether the ratio V/NE of the coordinate is smaller than the ratio V/NE of the boundary line L3. If it is determined in step S059 that the ratio V/NE of the coordinate is smaller than the ratio V/NE of the boundary line L3, the flow proceeds to step S065, and it is determined that the present gear position is the third shift position. Then, the flow ends.

If it is determined in step S059 that the ratio V/NE of the coordinate is equal to or greater than the ratio V/NE of the boundary line L3, the flow proceeds to step S060, and it is further determined whether the ratio V/NE of the coordinate is smaller than the ratio V/NE of the boundary line L4. If it is determined in step S060 that the ratio V/NE of the coordinate is smaller than the ratio V/NE of the boundary line L4, the flow proceeds to step S064, and it is determined that the present gear position is the fourth shift position. Then, the flow ends.

If it is determined in step S060 that the ratio V/NE of the coordinate is equal to or greater than the ratio V/NE of the boundary line L4, the flow proceeds to step S060A, and it is determined whether the clutch switch S5 is in the OFF state. If the clutch switch S5 is in the ON state, the flow proceeds to step S063, and it is determined that the present gear position is the fifth shift position. Then, the flow ends.

If it is determined in step S060A that the clutch switch S5 is in the ON state, the flow proceeds to step S061, and it is determined whether the ratio V/NE of the coordinate is smaller than the ratio V/NE of the boundary line L5. If it is determined in step S061 that the ratio V/NE of the coordinate is smaller than the ratio V/NE of the boundary line L5, the flow proceeds to step S063, and it is determined that the present gear position is the fifth shift position. Then, the flow ends.

If it is determined in step S061 that the ratio V/NE of the coordinate is equal to or greater than the ratio V/NE of the boundary line L5, the flow proceeds to step S062, and it is determined that the present gear position is the fifth over shift position. Then, the flow ends. When the gear position is determined to be the fifth over shift position, because the clutch switch S5 is not in the OFF state and the clutch is not completely disengaged, the gear potion is determined to be the half-engaged clutch state.

Next, referring to FIG. 6, the flow for determining a fuel cut lower limit engine speed value, above which a fuel amount to be supplied to the engine is cut, will be explained.

In this hybrid vehicle, when the vehicle decelerates, the fuel amount to be supplied to an engine is cut so as to reduce the fuel consumption during the deceleration. Then, when the engine speed becomes lower than a predetermined lower limit engine speed value below which the engine cannot drive the vehicle by itself, the fuel supply is restarted so as to maintain the engine speed at the lower limit. On the other hand, in the case where the fuel cut is continued until an idle stop, the lower limit engine speed above which the fuel cut is performed is lowered.

However, in such a case, if the clutch is half-disengaged when deceleration fuel cut is being performed, because the rotational force of the driving wheels is not transmitted to the motor, the most of the deceleration regeneration torque by the motor is applied to the engine, and the engine speed steeply drops. Therefore, even if the fuel supply is restarted when the engine speed reaches the predetermined lower limit engine speed value, there will be the problems that the engine will stall or that an excessive load will be applied to the engine. In order to overcome these problems, in the present embodiment, when a half-engaged clutch state is detected, the fuel cut lower limit engine speed value is elevated, and fuel supply is restarted at an engine speed higher than usual. Thus, in the present embodiment, the effectiveness in preventing engine stalls can be improved. In the following embodiment, when a half-engaged clutch state is detected, the fuel cut lower limit engine speed value is relatively high in comparison with the usual value by stopping the lowering of the fuel cut lower limit engine speed value which is performed in the usual occasion.

Figure 6:
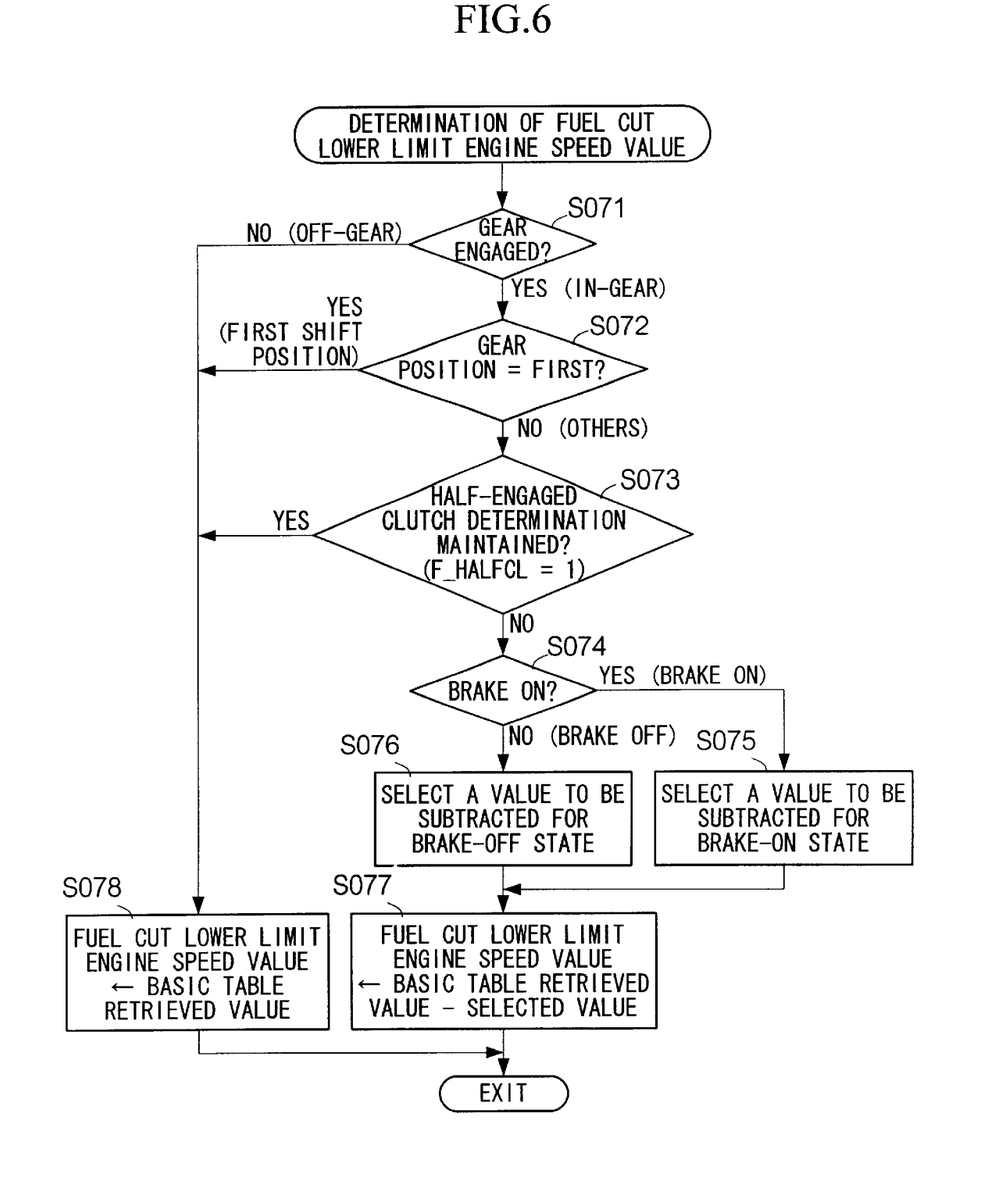
FIG. 6 is a flowchart showing a process for determining the fuel cut lower limit engine speed value according to the first embodiment.

In step S071 shown in FIG. 6, it is determined whether the gears are engaged. If the present state is an in-gear state, the flow proceeds to step S072, and it is further determined whether the gear position is the first shift position. If it is determined in step S072 that the gear position is other than the first shift position, the flow proceeds to step S073, and it is determined whether the half-engaged clutch determination is maintained by determining whether the half-engaged clutch determination maintaining flag F_HALFCL is "1".

In step S072, if the half-engaged clutch determination is not maintained, the flow proceeds to step S074, and it is determined whether the brake is in the ON state. If it is determined in step S074 that the brake is in the ON state, the flow proceeds to step S075, and a predetermined value for a brake-on state is set as a value to be subtracted from the fuel cut lower limit engine speed value. Then the flow proceeds to step S077. If it is determined in step S074 that the brake is in the OFF state, the flow proceeds to step S076, and a predetermined value for a brake-off state is set as a value to be subtracted from the fuel cut lower limit engine speed value. Then the flow proceeds to step S077.

In step S077, the value selected in step S075 or S076 is subtracted from a basic table retrieved value which is obtained in advance by retrieving in a basic table, and the resulted value is set as the fuel cut lower limit engine speed value. Then the flow ends.

On the other hand, when it is determined in step S071 that the gears are in the OFF state, or when it is determined in step S072 that the gear position is the first shift position, or when it is determined in step S073 that the half-engaged clutch determination is maintained, the flow proceeds to step S078, and the basic table retrieved value, which is obtained in advance by retrieving in a basic table, is set as the fuel cut lower limit engine speed value. Then the flow ends.

Therefore, the fuel cut lower limit engine speed value obtained in step S078 is greater than that obtained in step S077 by the subtracted value. By means of this, when the half-engaged clutch determination is maintained, because the fuel cut lower limit engine speed value becomes greater than usual, the effectiveness in preventing engine stalls can be improved, and it is also possible to prevent an excessive load from being applied to the engine E.

Next, referring to the flowchart shown in FIG. 7, a control flow for applying hysteresis in the fuel cut lower limit engine speed value will be explained. By applying hysteresis, it is possible to prevent hunting from occurring in a range neighboring the fuel cut lower limit engine speed value. Even in this control flow, it is determined whether the half-engaged clutch determination is maintained.

In step S081, it is determined whether the gears are engaged. If the gears are in an in-gear state, the flow proceeds to the step S082, and it is determined whether the half-engaged clutch determination is maintained. If it is determined in step S082 that the half-engaged clutch determination is not maintained, the flow proceeds to step S083, and it is determined whether the temperature of the cooling water in the engine E is equal to or higher than a predetermined temperature. If the cooling water temperature is equal to or higher than the predetermined temperature, the flow proceeds to step S084, and it is determined whether the vehicle is cruising. If it is determined in step S084 that the vehicle is not cruising, the flow proceeds to step S085. Also, when the gears are in an off-gear state in step S081, or when the half-engaged clutch determination is maintained in step S082, or when the temperature of the cooling water in the engine E is lower than the predetermined temperature in step S083, the flow proceeds to step S085.

In step S085, it is determined whether a fuel cut is being performed. If a fuel cut is being performed, the flow proceeds to step S087, an engine speed value is obtained by inputting the target idle speed in the lower graph (LOW) in the basic table shown in FIG. 10, and the obtained value is set as the fuel cut lower limit engine speed value. Then the flow ends. If it is determined in step S084 that the vehicle is cruising, the flow also proceeds to step S087, and the above procedure is performed.

Figure 10:
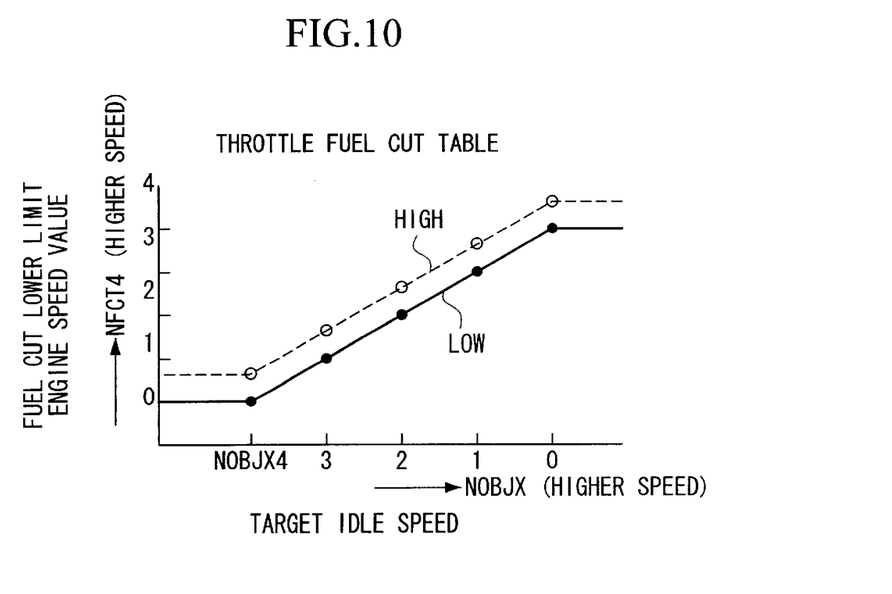
FIG. 10 is a graph of a fuel cut table used in the process shown in FIG. 7.

On the other hand, if it is determined in step S085 that a fuel cut is not being performed, the flow proceeds to step S086, an engine speed value is obtained by inputting the target idle speed in the upper graph (HIGH) in the basic table shown in FIG. 10, and the obtained value is set as the fuel cut lower limit engine speed value. Then the flow ends.

According to the above flow, if a half-engaged clutch determination is maintained, regardless of the temperature of the engine cooling water and whether the vehicle is cruising, it is determined only whether a fuel cut is being performed, and based on the determination, a fuel cut lower limit engine speed value is retrieved in the basic table shown in FIG. 10.

Figure 8:
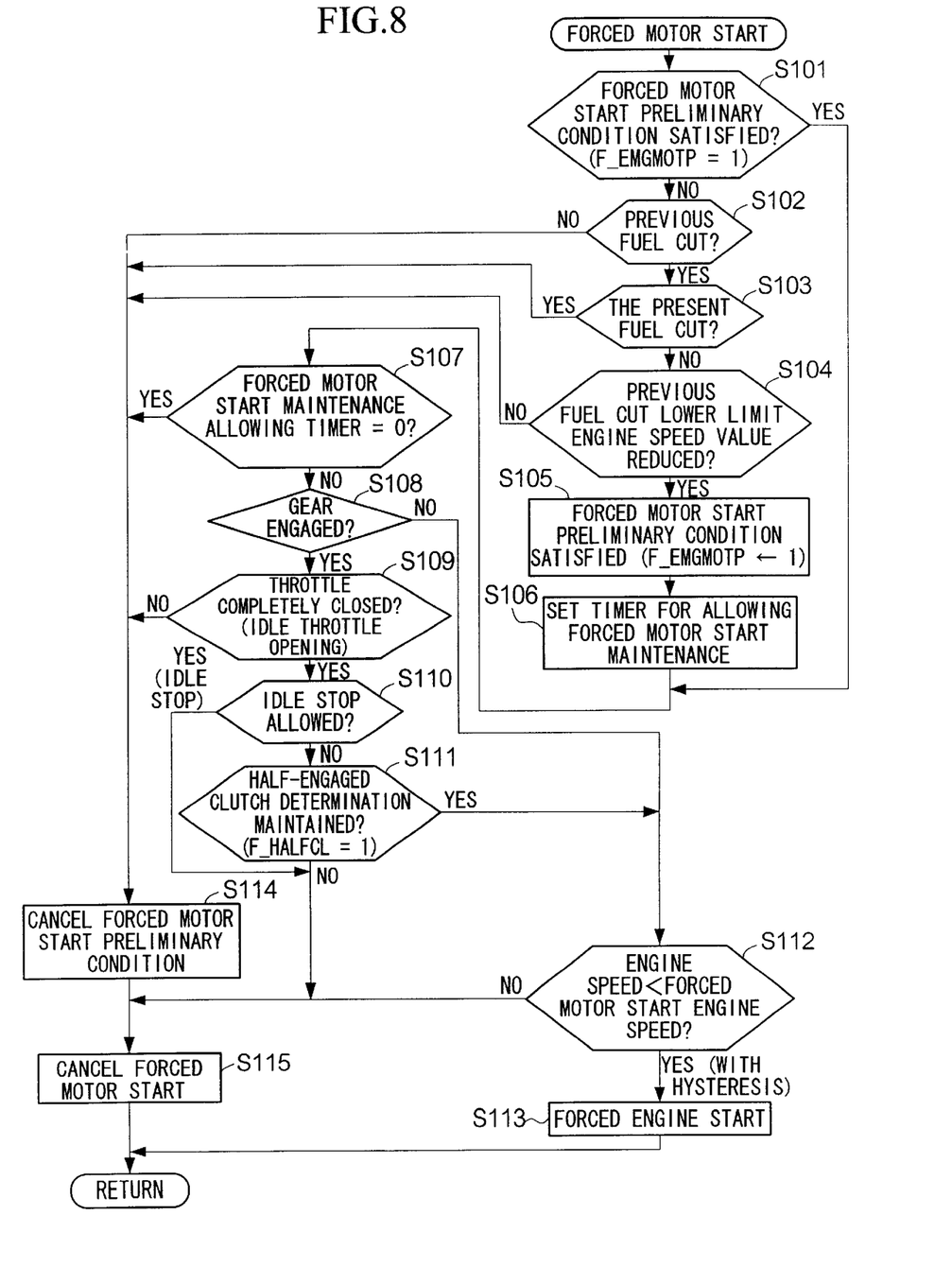
FIG. 8 is a flowchart showing a process for forcedly driving a motor according to the first embodiment.

Next, referring to the flowchart shown in FIG. 8, the control flow for performing a forced motor start will be explained. The purpose of this flow is to forcedly start the electric motor M when the engine E is likely to stall.

In step S101, it is determined, by judging whether a forced motor start preliminary condition determination flag F_EMGMOTP is "1", whether the forced motor start preliminary conditions are satisfied. The forced motor start preliminary conditions will be explained later.

If the forced motor start preliminary conditions are not satisfied, that is, if the forced motor start preliminary condition determination flag F_EMGMOTP is "0", the flow proceeds to step S102, and it is determined whether a fuel cut was performed in the previous cycle. If it is determined in step S102 that a fuel cut was not performed in the previous cycle, the flow proceeds to step S114, and the forced motor start preliminary condition determination flag F_EMGMOTP is set to "0" so that the forced motor start preliminary conditions are reset. Then, the flow proceeds to step S115, the forced motor start procedure is cancelled, and the flow returns.

If it is determined in step S102 that a fuel cut was performed in the previous cycle, the flow proceeds to step S103, and it is determined whether a fuel cut is being performed in the present cycle. If it is determined in step 103 that a fuel cut is being performed in the present cycle, the flow proceeds to step S114. If it is determined in step 103 that a fuel cut is not performed in the present cycle, the flow proceeds to step S104, and it is determined whether the fuel cut lower limit engine speed value was reduced in the previous cycle. If it is determined in step S104 that the fuel cut lower limit engine speed value was not reduced in the previous cycle, the flow proceeds to step S114.

In contrast, if it is determined in step S104 that the fuel cut lower limit engine speed value was reduced in the previous cycle, the flow proceeds to step S105. In this case, because the forced motor start preliminary condition is satisfied, the forced motor start preliminary condition determination flag F_EMGMOTP is set to "1", and the flow proceeds to step S106. In step S106, a forced motor start maintenance allowing timer is set, and the flow proceeds to step S107.

As well, if it is determined in step S101 that the forced motor start preliminary condition is satisfied, the flow proceeds to step S107.

That is, in the case where, a fuel cut was performed in the previous cycle (the determination in step S103 is Yes), a fuel cut is not performed in the present cycle (the determination in step S104 is No), and the fuel cut lower limit engine speed value was reduced in the previous cycle (the determination in step S104 is Yes), the forced motor start preliminary conditions are satisfied.

In step S107, it is determined whether the value of the forced motor start maintenance allowing timer is "0", and if it is "0", the flow proceeds to step S114. If it is determined in step S107 that the value of the timer is "1", the flow proceeds to step S108, and it is determined whether the gears are engaged.

If it is determined in step S108 that the gears are engaged, the flow proceeds to step S109. If it is determined in step S108 that the gears are not engaged, the flow proceeds to step S112, and it is determined whether the present engine speed is lower than a forced motor start engine speed at which the electric motor is to be started. If it is determined in step S112 that the present engine speed is equal to or greater than the forced motor start engine speed, the flow proceeds to step S115. In step S112, if the present engine speed is smaller than the forced motor start engine speed, the flow proceeds to step S113, and the forced motor start is performed. Then, the flow returns. According to the above flow, engine stalls can be prevented.

In step S109, it is determined whether the throttle is completely closed. If the throttle is not completely closed, that is, the degree of the throttle opening is not the degree of idle throttle opening, the flow proceeds to step S114. If it is determined in step S109 that the throttle is completely closed, that is, the degree of the throttle opening is the degree of the idle throttle opening, the flow proceeds to step S110, and it is determined whether an idle stop is allowed. If it is determined in step S110 that an idle stop is allowed, the flow proceeds to step S115. On the other hand, if it is determined instep S110 that an idle stop is not allowed, the flow proceeds to step S111, and it is determined whether a half-engaged clutch determination is maintained by detecting whether the half-engaged clutch determination maintaining flag F_HALFCL is "1".

In step S111, if the half-engaged clutch determination is maintained, the flow proceeds to step S112. In contrast, if the half-engaged clutch determination is not maintained, the flow proceeds to step S115. Therefore, in the case where, the forced motor start preliminary conditions are satisfied, the half-engaged clutch determination is maintained, and the present engine speed is lower than the forced motor start engine speed, the electric motor M will be forcedly started so as to prevent engine stalls.

According to the above embodiment, it is possible to securely detect a half-engaged clutch state. The clutch switch S5 is constructed not to enter the ON state unless the clutch pedal is fully depressed so that the OFF state of the clutch can be securely detected even when the clutch is abraded. In a half-engaged clutch state, the clutch pedal is not fully depressed but is only slightly depressed, and it is not possible to detect the half-engaged clutch state only based on the ON/OFF state of the clutch switch S5.

In contrast, according to the present embodiment, when the determination in step S060A shown in FIG. 5 is "Yes" (that is, when the clutch pedal is not fully depressed), and further when the gear position is determined to be the fifth over shift position, it is determined that the clutch is half-engaged. Thus, an half-engaged clutch state can be precisely detected.

Furthermore, when an half-engaged clutch state is detected in the present embodiment, the half-engaged clutch determination is maintained for a predetermined period of time, and the control is performed so as to correspond to: the half-engaged clutch state. Therefore, unstable variations in the engine speed can thereby be prevented.

Figure 11:
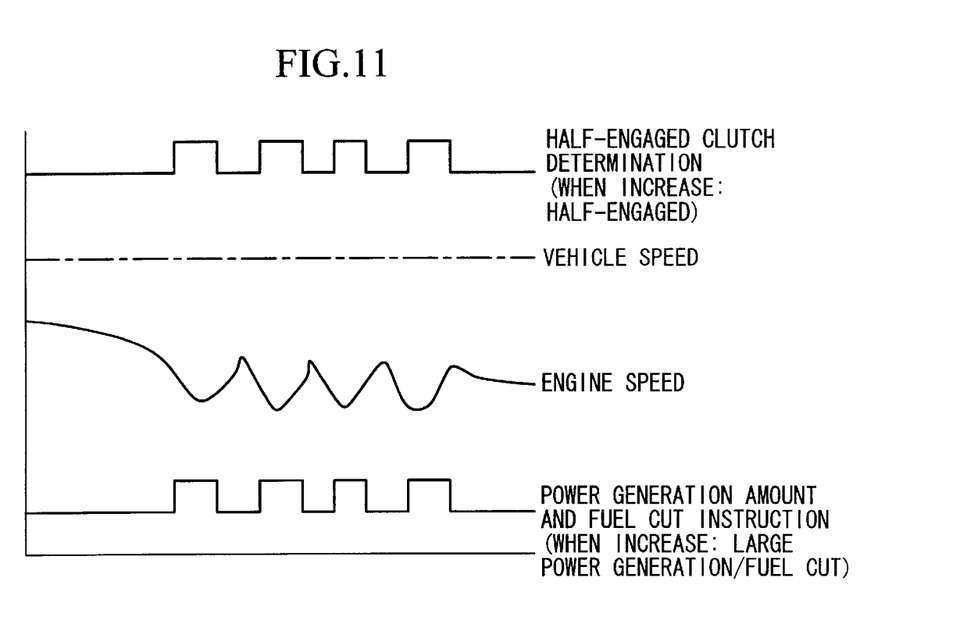
FIG. 11 is a graph showing the variation in engine speed when the half-engaged clutch determination process according to the present invention is not performed.

For example, in a conventional hybrid vehicle, when the clutch is half-disengaged from a fully-engaged state during the deceleration regeneration, because the driving force of the driving wheels is not transmitted to the electric motor, the whole regeneration torque generated by the electric motor is suddenly applied to the engine as a large load. This phenomenon will repeatedly occur each time the clutch is half-disengaged, and, as shown in FIG. 11, it results in repeating variations in the engine speed.

Figure 12:
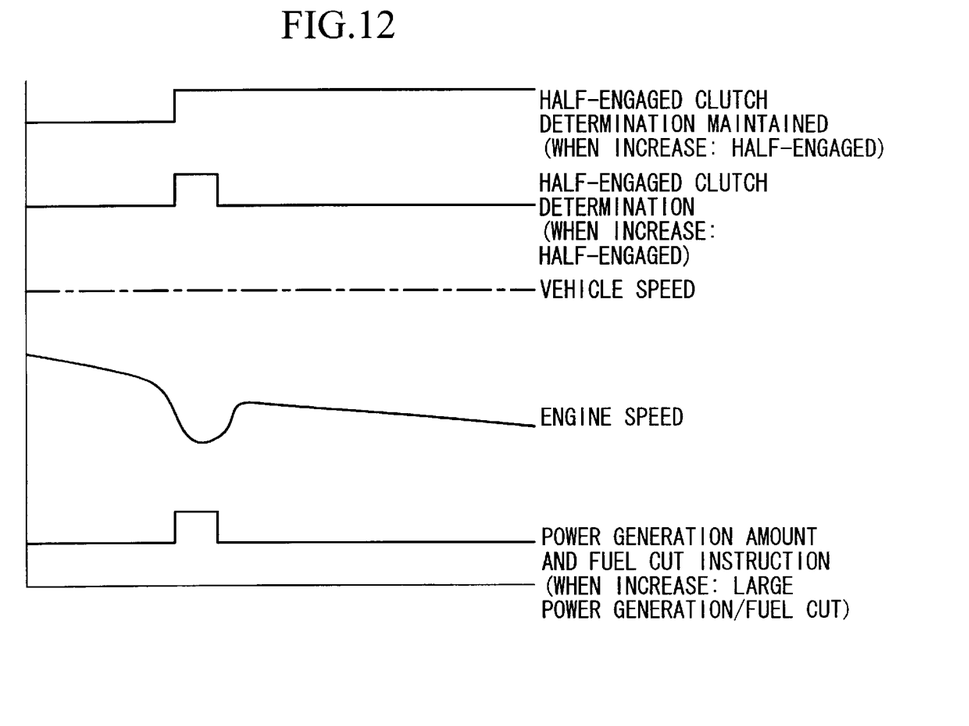
FIG. 12 is a graph showing the variation in engine speed when the half-engaged clutch determination process according to the present invention is performed.

In contrast, according to the present embodiment, by maintaining the half-engaged clutch determination as shown in FIG. 12, such repeating variations in the engine speed can be prevented as shown in the same figure.

Figure 3:
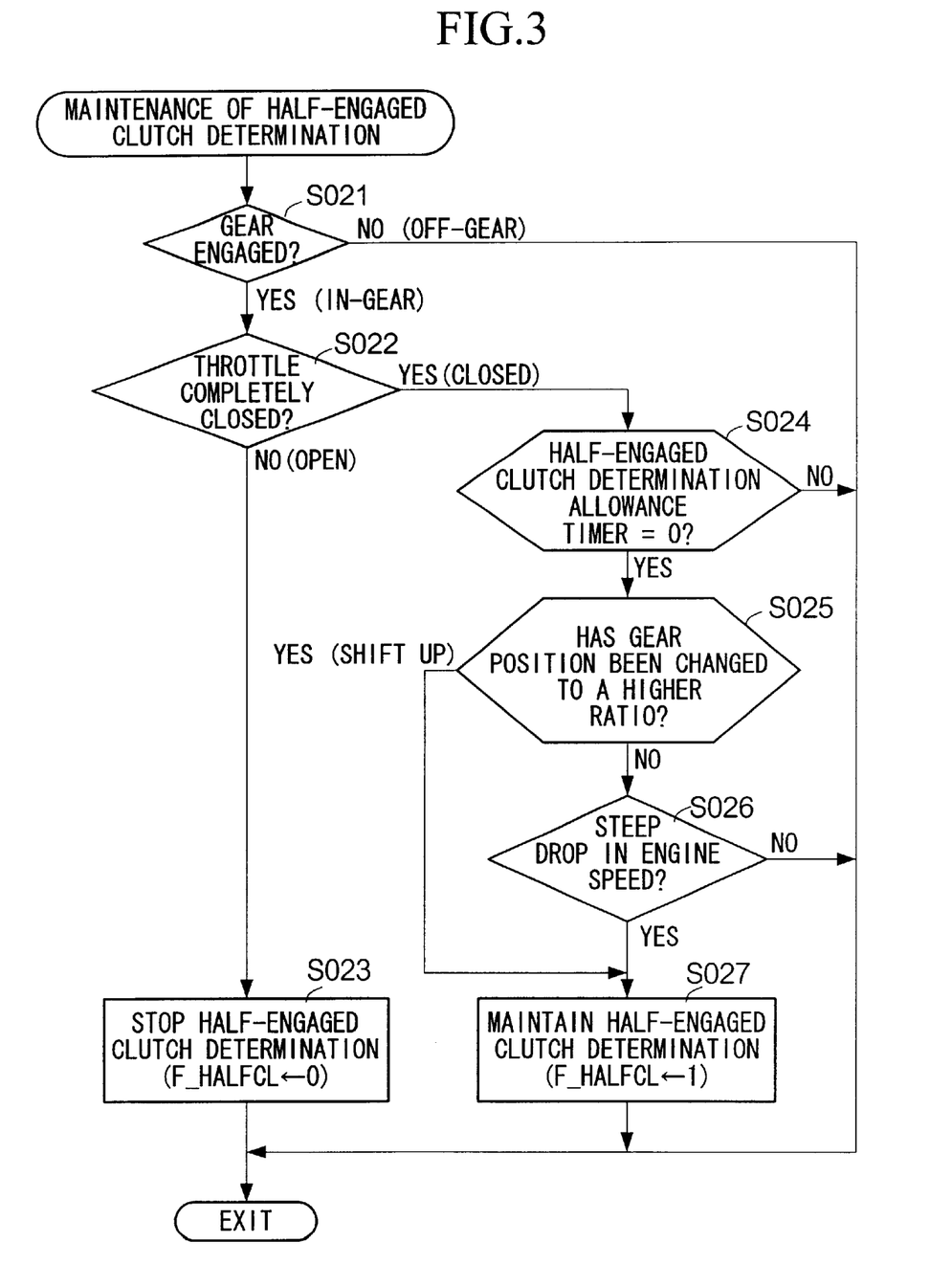
FIG. 3 is a flowchart showing a process for maintaining the determination signal indicating that the clutch is half-engaged according to the first embodiment.

In addition, because the half-engaged clutch determination will be cancelled in step S022 shown in FIG. 3 as soon as the throttle valve is slightly opened, the cancellation of the half-engaged clutch determination can be rapidly and automatically performed in accordance with the intent of the driver.

Moreover, when a half-engaged clutch determination is maintained, in step S010 shown in FIG. 2, the charging/regeneration allowing lower limit engine speed value is set to a value to which a predetermined value a is added. In this way, because the charging/regeneration allowing lower limit engine speed value, below which the charging and regeneration is forbidden, is increased when a half-engaged clutch determination is maintained, the load applied to the engine can be reduced. Therefore, engine stalls due to the regeneration operation in a half-engaged clutch state can be effectively prevented.

Furthermore, according to the present embodiment, when a half-engaged clutch determination is maintained, the fuel cut lower limit engine speed value is increased by canceling the cut down thereof which is to be performed in the other case. Therefore, even in this point, engine stalls due to the load increase in the half-engaged clutch state can be effectively prevented.

Figure 7:
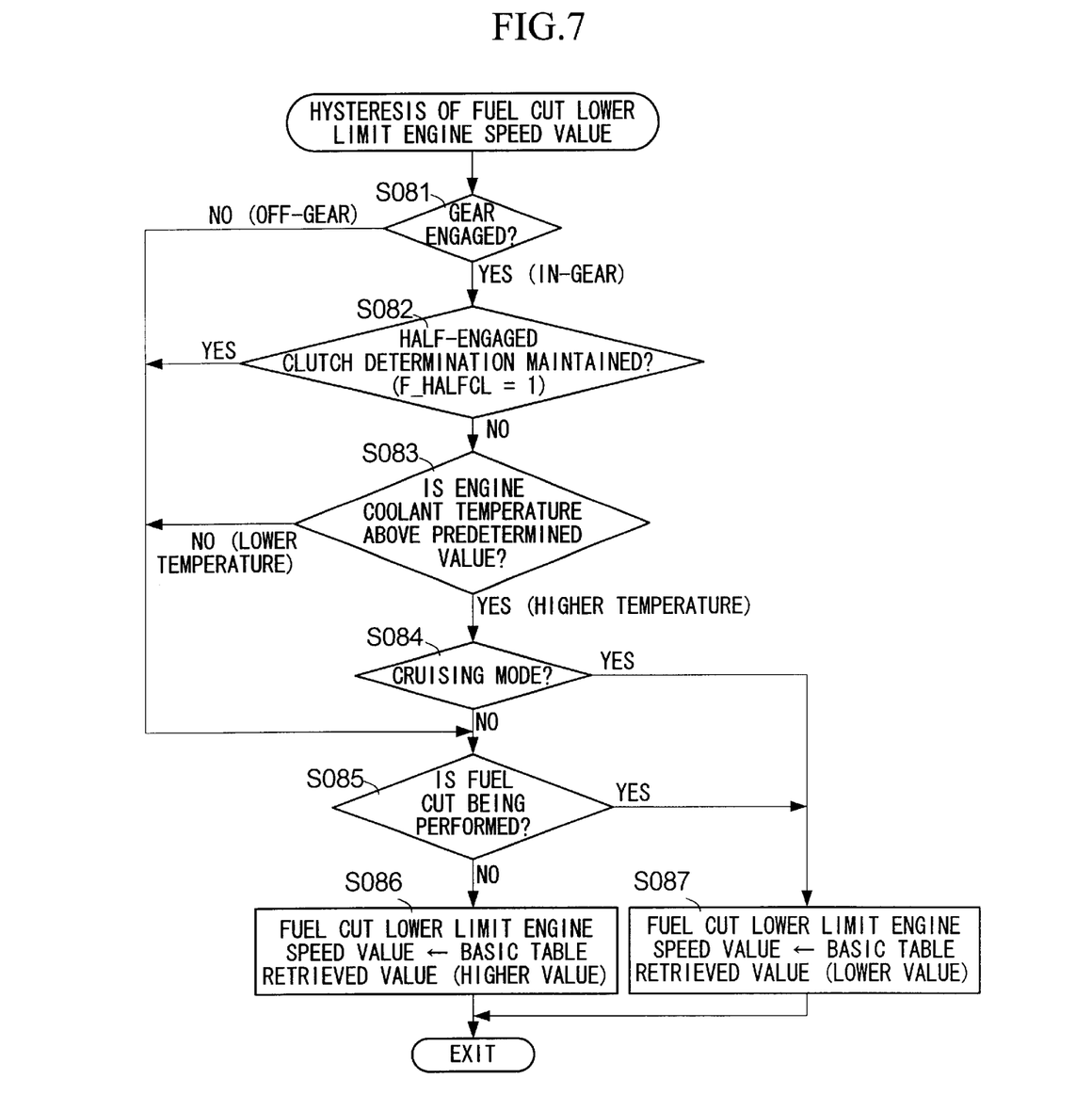
FIG. 7 is a flowchart showing a process for determining the hysteresis of the fuel cut lower limit engine speed value according to the first embodiment.

In addition, according to the present embodiment, as shown in FIG. 7, if a half-engaged clutch determination is maintained, regardless of the temperature of the engine cooling water and whether the vehicle is cruising, it is determined only whether a fuel cut is being performed, and based on this determination, a fuel cut lower limit engine speed value is retrieved from the basic table shown in FIG. 10. Thus, by applying hysteresis to the fuel cut lower limit engine speed value, it is possible to prevent hunting from occurring.

Furthermore, according to the present embodiment, in the case where, the forced motor start preliminary conditions are satisfied, the half-engaged clutch determination is maintained, and the present engine speed is lower than the forced motor start engine speed value, the electric motor will start to rotate the output shaft of the engine E. Therefore, it is possible to forcedly drive the engine E when the engine E is likely to stall, and engine stalls can be prevented.

What is claimed is:

1. An engine stall prevention apparatus for a hybrid vehicle which comprises an engine which outputs driving force to drive a vehicle; an electric motor which assists the driving force of the engine; and a power storage unit which stores electric power generated by the electric motor when the electric motor in functioning as a power generator or when deceleration regeneration is performed by the electric motor;

the engine stall prevention apparatus comprising:
    a clutch operation detection device which detects an engaging state of a clutch, which has been engaged by a driver;
    a clutch state determination device which determines the state of the clutch based on the relationship between vehicle speed and engine speed;
    a throttle opening degree determination device which determines a degree of throttle opening the engine;
    a first engine speed modification device which modifies a charging/regeneration allowing lower limit engine speed value above which deceleration regeneration by the electric motor is allowed; and
    a half-engaged clutch determination maintaining device which outputs a determination signal indicating that the clutch is half-engaged for a predetermined period of time, when the clutch operation detection device detects that the clutch is not disengaged, the throttle opening degree determination device determines that the degree of throttle opening of the engine is no more than a predetermined degree, and the clutch state determination device determines that the clutch is half engaged;
    wherein the first engine speed modification device elevates the charging/regeneration allowing lower limit engine speed value while the half-engaged clutch determination maintaining device outputs a determination signal indicating that the clutch is half-engaged.

2. An engine stall prevention apparatus according to claim 1, further comprising a second engine speed modification device which modifies a fuel cut lower limit engine speed value above which a fuel amount to be supplied to the engine is cut during deceleration regeneration, wherein the second engine speed modification device elevates the fuel cut lower limit engine speed value while the half-engaged clutch determination maintaining device outputs a determination signal indicating that the clutch is half-engaged.

3. An engine stall prevention apparatus according to claim 1, further comprising an engine start allowing device which allows the electric motor to start the engine or to assist the output of the engine, wherein the engine start allowing device drives the electric motor to start the engine or to assist the output of the engine, while the half-engaged clutch determination maintaining device outputs a determination signal indicating that the clutch is half-engaged, and engine speed becomes lower than a predetermined engine speed value.

4. An engine stall prevention apparatus according to claim 2, further comprising an engine start allowing device which allows the electric motor to start the engine or to assist the output of the engine, wherein the engine start allowing device drives the electric motor to start the engine or to assist the output of the engine, while the half-engaged clutch determination maintaining device outputs a determination signal indicating that the clutch is half-engaged, and engine speed becomes lower than a predetermined engine speed value.

* * * * *